United States Patent
Zu et al.

(10) Patent No.: US 11,516,705 B2
(45) Date of Patent: Nov. 29, 2022

(54) NETWORK PERFORMANCE IMPROVEMENT METHOD AND DEVICE

(71) Applicant: HUAWEI TECHNOLOGIES CO., LTD., Shenzhen (CN)

(72) Inventors: Shengze Zu, Shenzhen (CN); Yu Deng, Shanghai (CN); Songping Yao, Beijing (CN); Wenguo Zhong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/957,135

(22) PCT Filed: Mar. 28, 2018

(86) PCT No.: PCT/CN2018/080797
§ 371 (c)(1),
(2) Date: Jun. 23, 2020

(87) PCT Pub. No.: WO2019/127954
PCT Pub. Date: Jul. 4, 2019

(65) Prior Publication Data
US 2020/0351716 A1      Nov. 5, 2020

(30) Foreign Application Priority Data
Dec. 27, 2017   (CN) .......................... 201711449460.2

(51) Int. Cl.
*H04W 28/18*   (2009.01)
*H04W 76/34*   (2018.01)
(Continued)

(52) U.S. Cl.
CPC .......... *H04W 28/18* (2013.01); *H04W 76/15* (2018.02); *H04W 76/34* (2018.02); *H04W 88/02* (2013.01)

(58) Field of Classification Search
CPC ..... H04W 28/18; H04W 76/34; H04W 76/15; H04W 28/08; H04W 40/12; H04W 28/16
See application file for complete search history.

(56) References Cited

U.S. PATENT DOCUMENTS

2011/0069635 A1   3/2011   Low et al.
2012/0124229 A1*  5/2012   Sahu ................ H04W 76/10
                                                709/228
(Continued)

FOREIGN PATENT DOCUMENTS

CN   101702815 A   5/2010
CN   103248451 A   8/2013
(Continued)

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.6.0 (Jun. 2013), 2017, total 286 pages.

(Continued)

Primary Examiner — Chae S Lee
(74) Attorney, Agent, or Firm — Maier & Maier, PLLC (57) ABSTRACT

A network performance improvement method and an apparatus for user equipment. In the network performance improvement method, user equipment establishes a first PDN connection and transmits data of a first application program through the first PDN connection. Then, the user equipment starts a second application program and determines whether a current network status satisfies a quality of service requirement of the second application program. When determining that the current network status does not satisfy the quality of service requirement of the second application program, the user equipment starts to establish a second PDN connection, and transmits, after the second (Continued)

PDN connection is successfully established, at least a part of application data of the second application program through the second PDN connection.

17 Claims, 8 Drawing Sheets

(51) Int. Cl.
*H04W 76/15* (2018.01)
*H04W 88/02* (2009.01)

(56) References Cited

U.S. PATENT DOCUMENTS

| | | |
|---|---|---|
| 2014/0341021 A1 | 11/2014 | Han et al. |
| 2015/0163811 A1 | 6/2015 | Konstantinou et al. |
| 2015/0201394 A1 | 7/2015 | Qu et al. |
| 2015/0358483 A1* | 12/2015 | Jeong ............. H04W 28/0289 370/328 |
| 2016/0255540 A1* | 9/2016 | Kweon ............. H04W 76/15 370/237 |
| 2017/0289265 A1* | 10/2017 | Faccin ............. H04W 48/17 |
| 2018/0310350 A1* | 10/2018 | Stojanovski ......... H04L 61/1511 |
| 2019/0159072 A1 | 5/2019 | Zhu et al. |
| 2021/0181926 A1* | 6/2021 | Jung ................. G06F 1/3215 |

FOREIGN PATENT DOCUMENTS

| | | |
|---|---|---|
| CN | 103299700 A | 9/2013 |
| CN | 107295575 A | 10/2017 |
| EP | 3 373 648 A1 | 9/2018 |
| GB | 2485234 A | 5/2012 |
| WO | 2015/057034 A1 | 4/2015 |
| WO | 2017/113046 A1 | 7/2017 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.4.0 (Jun. 2017), 2017, total 386 pages.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.2.0 (Dec. 2017), 2017, total 404 pages.

* cited by examiner

NETWORK PERFORMANCE IMPROVEMENT METHOD AND DEVICE

CROSS-REFERENCE TO RELATED APPLICATIONS

This application is a U.S. National Stage of International Patent Application No. PCT/CN2018/080797 filed on Mar. 28, 2018, which claims priority to Chinese Patent Application No. 201711449460.2, filed on Dec. 27, 2017. Both of the aforementioned applications are incorporated herein by reference in their entities.

TECHNICAL FIELD

Embodiments relate to the field of smart terminals, and more specifically, to a network performance improvement method and device.

BACKGROUND

With latest development of a digital technology, a user can use a mobile terminal conveniently to perform communication and process personal information. Examples of such mobile device include a mobile communications terminal, a personal digital assistant (PDA), a smartphone, and a tablet computer. Particularly, mobile terminals have developed into mobile convergence devices that support functions such as a voice call, a video call, an SMS message, an email, navigation, image capture, media (video and music) play, Internet access, an instant message, and a social networking service (SNS).

In addition, as popular Internet applications such as a game, a live broadcast, a video, and an office application accelerate transfer to a mobile terminal, more third-party application developers are turning their attention to a high-quality pipeline QoS capability of an operator, so as to provide a stable network assurance service for a popular application and a VIP customer and set up a mobile Internet with a large number of users, fast access, good experience, and a reduced bandwidth by using complementary strengths of an operator and a third-party application developer.

Cooperation between an operator and a third-party application developer is generally setting up a dedicated bearer from a network side, to ensure a bandwidth and a latency inside a wireless network and a core network. However, a bandwidth guarantee technology consumes excessive resources of a radio resource and a network device, and excessive use may lead to great expansion of the network and excessive investment of the operator. Consequently, it is difficult to implement the solution from the perspective of the operator.

In addition, improvement of user experience of a popular Internet application requires strong adhesion of an operator, a third-party application developer, and a terminal manufacturer, and it is necessary for the three parties to work out a deployment strategy. Therefore, a real-time combat mobile game further includes applications that are sensitive to the latency or bandwidth, such as an Internet live broadcast, a payment transaction, real-time control, and real-time audio and video communications. In this case, how to ensure user experience in using the foregoing services in a user-intensive area and a network capability for flexibly providing an on-demand service needs to be urgently resolved.

Therefore, introducing a differentiated solution of a mobile terminal network based on a user application service requirement to provide a mobile network QoS guarantee service for a user becomes a current trend of exploration by terminal manufacturers.

SUMMARY

The embodiments describe a network performance improvement method and user equipment, so as to provide a differentiated network service experience for an application program of the user equipment.

To achieve the foregoing objective, the following technical solutions are used in embodiments.

According to a first aspect, an embodiment provides a network performance improvement method, including: establishing, by user equipment, a first packet data network PDN connection to a mobile network; transmitting, by the user equipment, service data of a first application program of the user equipment through the first PDN connection; starting, by the user equipment, a second application program; determining, by the user equipment, whether a network status of the currently accessed mobile network satisfies a quality of service (QoS) requirement of the second application program; starting, when determining that the network status does not satisfy the quality of service requirement of the second application program, to establish a second PDN connection; and transmitting at least a part of service data of the second application program through the second PDN connection.

It can be understood that the first application program and the second application program may access a remote network through the different PDN connections, thereby reducing a load of a single PDN connection, and improving network access efficiency of the application program.

After the second application program is started, the second PDN connection is established when the network status does not satisfy the QoS requirement of the second application program. In this way, a process of dynamically establishing the second PDN connection can be started only when a user uses the second application program, that is, the second PDN connection is established as required, improving flexibility of the user equipment.

In a possible method, when that the network status satisfies the quality of service requirement of the second application program is determined, the service data of the second application program is transmitted through the first PDN connection.

When the current network status is comparatively good, the first application program and the second application program may jointly use a channel of the first PDN connection, omitting a process of creating a new PDN connection, and avoiding unnecessary power consumption waste.

In a possible method, after starting the second application program, the user equipment determines whether an identifier of the second application program exists in a preset application list. Only if the identifier of the second application program exists in the preset application list, the subsequent step of determining whether the network status satisfies the QoS requirement of the second application program and other steps are performed.

For example, the preset application list stores an identifier of an application program of a higher priority or importance degree. After the application program in the preset application list is started, a second PDN connection or more PDN connections may be established as required. For example, both the second application program and a third application program exist in the preset application list. The second PDN connection may be established as required after the second application program is started, and the third PDN connection may be established as required after the third application program is started. An application program that does not exist in the preset application program list can only jointly use the first PDN connection. For example, neither the first application program nor a fourth application program exists in the preset application list, then both the first application program and the fourth application program use the first PDN connection to transmit service data.

In a possible method, the user equipment creates the foregoing preset application list according to a usage habit of a user. For example, the user equipment obtains, through screening based on application usage status data collected in first duration, first N application programs of comparatively high use frequency of the user, and stores the first N application programs in the preset application list.

In a possible method, a "data service enhancement" service may be enabled for an application program by setting an interface (that is, the second PDN connection may be started as required by the application program that has enabled the service), so that the user equipment may store an application list that has enabled the service.

The preset application list that is created through application usage habit analysis of the user or setting of the user satisfies a personalized requirement of users, so as to satisfy a difference of application usage habits among the users.

In a possible method, the method further includes: installing the second application program, and adding the identifier of the second application program to the preset application list.

When a user downloads and installs an application program from an application market, the user equipment may display a pop-up prompt interface to prompt the user whether to enable a "data service enhancement" service for the application program (that is, the second PDN connection may be started as required by the application program that has enabled the service). If the user agrees to enable the service, the second application program may be added to the foregoing preset application list.

In a possible method, the method further includes: stopping running the second application program; and releasing the second PDN connection in response to the stopping running the second application program.

The user may exit the second application program to release the second PDN connection. In this way, for an application program in the application list, the second PDN connection may be established as required when the application program is started, and the second PDN connection is released in time after the application program is exited.

In a possible method, the network status includes at least one of a latency, a bandwidth, or a jitter. The quality of service requirement of the application program also includes at least one of a latency, a bandwidth, or a jitter.

For a video application or a download application, the user pays more attention to the bandwidth or a speed. For a chat application, the user pays attention to a latency indicator. The application program sets a QoS requirement parameter according to a service requirement, for example, a bandwidth >2 Mbps and a latency <60 ms.

In a possible method, the user equipment transmits at least a part of service data of the second application program through the first PDN connection.

The second application program may access the remote network through the two PDN connections, improving network access efficiency of the second application program. For example, service data of the first application program is allocated to the two PDN connections according to a fixed ratio (for example, a one-to-one ratio is equally divided between the two PDN connections).

According to a second aspect, an embodiment provides user equipment, including a first establishment unit, a first transmission unit, a starting unit, a determining unit, a second establishment unit, and a second transmission unit, where the first establishment unit is configured to establish a first PDN connection between the user equipment and a mobile network; the first transmission unit is configured to transmit service data of a first application program through the first PDN connection; the starting unit is configured to start a second application program; the determining unit is configured to determine whether a network status of the accessed mobile network satisfies a QoS requirement of the second application program; the second establishment unit is configured to establish a second PDN connection when the network status does not satisfy the QoS requirement of the second application program; and the second transmission unit is configured to transmit at least a part of service data of the second application program through the second PDN connection.

In a possible embodiment, the determining unit is further configured to determine whether an identifier of the second application program exists in a preset application list.

In a possible embodiment, the user equipment further includes a creation unit, configured to create the preset application list according to a usage habit of a user.

In a possible embodiment, the creation unit is further configured to add the identifier of the second application program to the preset application list when the application program is installed.

In a possible embodiment, the user equipment further includes a releasing unit, configured to release the second PDN connection when running the second application program is stopped.

According to a third aspect, an embodiment provides user equipment, including: a processor, a memory, a bus, and a communications interface. The memory is configured to store a computer execution instruction, the processor is connected to the memory through the bus, and when the user equipment is running, the processor executes the computer execution instruction stored in the memory, so that the user equipment performs any one of the foregoing network performance improvement methods.

According to a fourth aspect, an embodiment provides a computer-readable storage medium, where the computer-readable storage medium stores an instruction, and when the instruction is run on any one of the foregoing user equipments, the user equipment performs any one of the foregoing network performance improvement methods.

According to a fifth aspect, an embodiment provides a computer program product including an instruction, where when the instruction is run on any one of the foregoing user equipments, the user equipment performs any one of the foregoing network performance improvement methods.

In the embodiments, names of components of the foregoing user equipment do not constitute a limitation on the user equipment itself. In an actual implementation, the components may have other names. For example, any component whose function is similar to that in the embodiments may be utilized, as desired.

In addition, for technical effects brought by any manner in the second aspect to the fifth aspect, refer to technical effects brought by different methods in the first aspect. Details are not described herein again.

BRIEF DESCRIPTION OF DRAWINGS

To describe technical solutions in embodiments more clearly, the following briefly describes accompanying drawings required for describing the embodiments or the prior art. It is clear that the accompanying drawings in the following description show merely some embodiments, and a person of ordinary skill in the art may still derive other drawings from these accompanying drawings without creative efforts.

DESCRIPTION OF EMBODIMENTS

The following describes technical solutions in the embodiments with reference to accompanying drawings in the embodiments.

Expressions such as "first" and "second" used herein may represent various elements regardless of order and/or importance, and do not limit the corresponding elements. For example, first user equipment and second user equipment may represent different user equipments regardless of order or importance. For example, a first element may be referred to as a second element, and similarly, a second element may be referred to as a first element, as desired.

Figure 1:
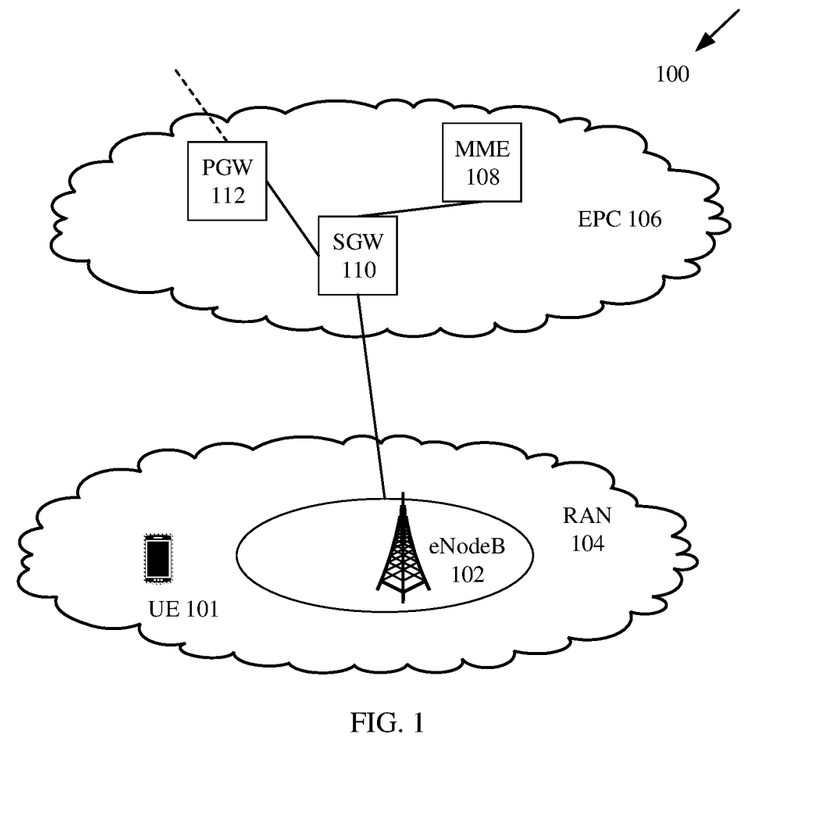
FIG. 1 is a schematic diagram of a 3GPP system according to an embodiment.

FIG. 1 is a schematic diagram of an example of a 3GPP system 100 according to some embodiments. The 3GPP system 100 is a public land mobile network (PLMN) or an equivalent public land mobile network (EPLMN), and can support one or more radio RAT networks, for example, an 4G/LTE system, or a 3G or 2G system (not shown in the figure). Each 3GPP system has a fixed infrastructure unit, such as a wireless communications station, to form a wireless network distributed in a geographical area. An infrastructure unit may also refer to an access point, an access terminal, a base station, a NodeB, an evolved NodeB (eNodeB), or another term used in the art. The wireless communications station may provide a service for a geographical area.

The 4G/LTE system shown in FIG. 1 includes a radio access network (RAN) 104 and an evolved packet core (EPC) 106. The RAN 104 includes a wireless communications station eNodeB 102. The EPC 106 includes a PDN GW (packet data network gateway, also referred to as P_GW) 112, a serving gateway (SGW) 110, and a mobility management entity (MME) 108 that controls the SGW 110. As a boundary point between a RAN 204 and a core network, the SGW 110 is used as a data channel that connects the eNodeB 102 and a PDN GW 212, and the PDN GW includes a communications node that serves as a PDN access point. A current PDN connection path 116 is illustrated with a dashed line.

In the example shown in FIG. 1, to establish an EPS bearer in the 4G system, user equipment 101 sends a PDN connection request to the eNodeB 102. Once the PDN connection request message is received, the eNodeB 102 and the evolved packet core 106 may establish the EPS bearer to perform a data service, and the user equipment may access at least one external IP network by using the EPS network through the PDN connection.

The PDN connection is defined as an association between user equipment represented by an IPv4 address and/or an IPv6 prefix and a PDN represented by a PDN identifier (also referred to as APN). The PDN connection is provided by an EPC entity or node that is referred to as PDN GW.

The EPC supports one user equipment to perform IP service exchange with a plurality of PDNs simultaneously through one or more PDN GWs. The user equipment 101 provided in FIG. 1 can support access through a plurality of PDN connections, that is, the user equipment 101 can establish a plurality of PDN connections simultaneously through a plurality of PDN GWsor one PDN GW, and further access different networks through the plurality of PDN connections, so as to satisfy a requirement of a user for accessing a plurality of networks simultaneously.

User equipment supporting multiple PDN connectivity may establish a plurality of PDN connections for an application that is sensitive to a latency or a bandwidth, for example, a real-time combat mobile game, an Internet live broadcast, a payment transaction, real-time control, or real-time audio and video communication, to allow the corresponding applications to use a remote IP network through the different PDN connections, providing differentiated network experience of the application.

Use of a plurality of PDNs needs to be started as required by the user equipment according to a certain policy, to establish PDN connections other than a default PDN connection for the user equipment. The embodiments describe in the following how user equipment in an LTE/EPC system starts a plurality of PDN connections according to a corresponding policy to provide network enhanced service experience for an application program.

Figure 2:
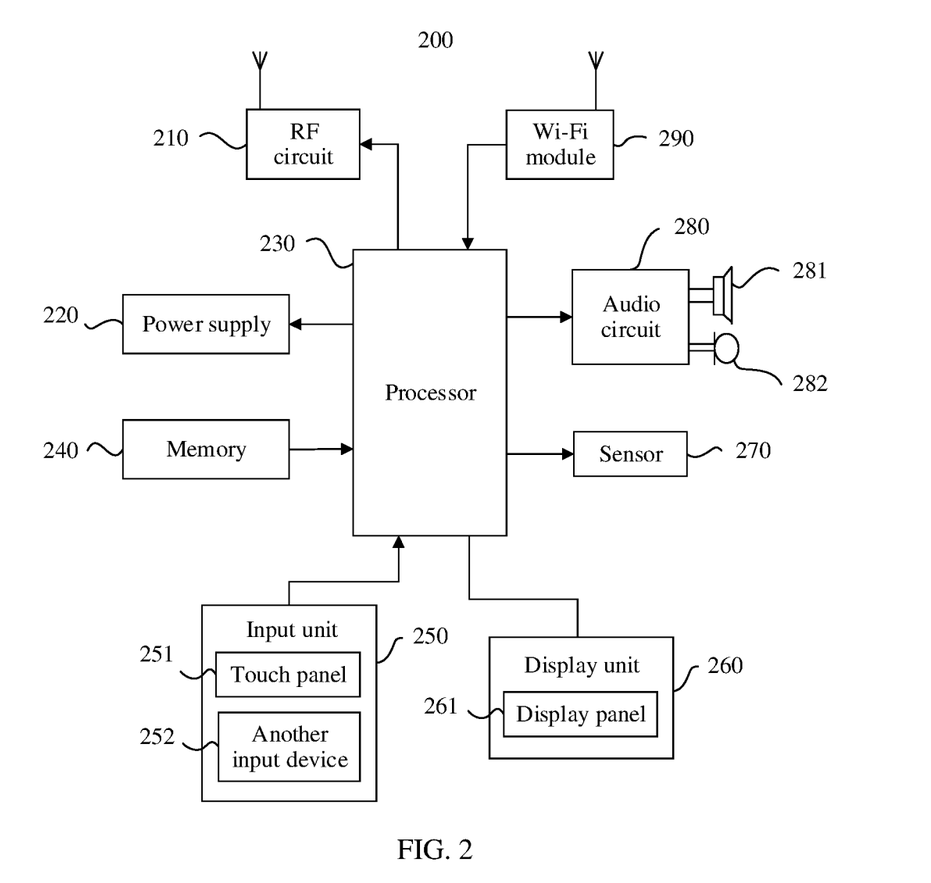
FIG. 2 is a schematic structural diagram of user equipment according to an embodiment.

Before how the user equipment 101 starts the plurality of PDN connections or a new PDN connection is described, a structural block diagram of the user equipment 101 is first described. FIG. 2 is a schematic structural diagram of the user equipment 101 in FIG. 1 according to an embodiment. The user equipment is described by using a mobile phone 200 as an example. Referring to FIG. 2, the mobile phone 200 includes components such as a radio frequency (RF) circuit 210, a power supply 220, a processor 230, a memory 240, an input unit 250, a display unit 260, a sensor 270, an audio circuit 280, and a wireless fidelity (Wi-Fi) module 290. A person of ordinary skill in the art may understand that, a structure of the mobile phone shown in FIG. 2 does not constitute a limitation on the mobile phone. The mobile phone 200 may include more or fewer components than those shown in the figure, or combine some components, or have different component arrangements.

The following describes the components of the mobile phone 200 in detail with reference to FIG. 2.

The RF circuit 210 may be configured to receive and send information or to receive and send signals during a call. For example, the RF circuit 210 may send downlink data received from a base station to the processor 230 for processing, and send uplink data to the base station.

Generally, an RF circuit includes, but is not limited to, an RF chip, an antenna, at least one amplifier, a transceiver, a coupler, a low noise amplifier (LNA), a duplexer, a radio frequency switch, and the like. In addition, the RF circuit 210 may further perform wireless communication with a network and another device. The wireless communication may be implemented through any communications standard or protocol, including but not limited to a global system for mobile communications (GSM), a general packet radio service (GPRS), a code division multiple access (CDMA), a wideband code division multiple access (WCDMA), a long term evolution (LTE), an email, a short message service (SMS), or the like.

The memory 240 may be configured to store a software program and a module. By running the software program and the module stored in the memory 240, the processor 230 performs various functional applications of the mobile phone 200 and process data. The memory 240 may mainly include a program storage area and a data storage area. The program storage area may store an operating system, an application program required by at least one function (such as a voice play function and an image play function), and the like. The data storage area may store data (such as audio data and a phone book) that is created based on use of the mobile phone 200, and the like. In addition, the memory 240 may include a high-speed random access memory (RAM), and may further include a nonvolatile memory such as at least one magnetic disk storage device, a flash memory, or another volatile solid-state storage device. The memory 240 may further store a knowledge base, a tag base, and an algorithm base.

The input unit 250 may be configured to receive input digital or character information and generate key signal input related to a user setting and a function control of the mobile phone 200. For example, the input unit 250 may include a touch panel 251 and another input device 252. The touch panel 251, also referred to as a touchscreen, may collect a touch operation performed by the user on or near the touch panel 251 (for example, an operation performed by the user on or near the touch panel 251 by using any proper object or accessory such as a finger or a stylus), and may drive a corresponding connection apparatus based on a preset program. Optionally, the touch panel 251 may include two parts: a touch detection apparatus and a touch controller. The touch detection apparatus detects a touch position of the user, detects a signal brought by the touch operation, and transfers the signal to the touch controller. The touch controller receives touch information from the touch detection apparatus, converts the touch information into touch point coordinates, sends the touch point coordinates to the processor 230, and can receive and execute a command sent by the processor 230. In addition, the touch panel 251 may be implemented in a plurality of types, such as a resistive type, a capacitive type, an infrared type, and a surface acoustic wave type. In addition to the touch panel 251, the input unit 250 may further include another input device 252. For example, the another input device 252 may include, but is not limited to, one or more of a physical keyboard, a function key (such as a volume control key or an on/off key), a trackball, a mouse, a joystick, and the like.

The display unit 260 may be configured to display information entered by the user or information provided to the user, and various menus of the mobile phone 200. The display unit 260 may include a display panel 261. Optionally, the display panel 261 may be configured in a form such as a liquid crystal display (LCD) or an organic light-emitting diode (OLED). Further, the touch panel 251 may cover the display panel 261. When detecting the touch operation on or near the touch panel 251, the touch panel 251 transmits the touch operation to the processor 230 to determine a type of a touch event, and the processor 230 provides corresponding visual output, based on the type of the touch event, on the display panel 261. In FIG. 2, the touch panel 251 and the display panel 261 are used as two independent parts to implement input and output functions of the mobile phone 200. However, in some embodiments, the touch panel 251 and the display panel 261 may be integrated to implement the input and output functions of the mobile phone 200.

The mobile phone 200 may further include at least one sensor 270, such as an optical sensor, a motion sensor, or another sensor. For example, the optical sensor may include an ambient optical sensor and a proximity sensor. The ambient optical sensor may adjust luminance of the display panel 261 based on brightness of ambient light. The proximity sensor may turn off the display panel 261 and/or backlight when the mobile phone 200 is moved close to an ear. As a motion sensor, an accelerometer sensor may detect an acceleration value in all directions (usually on three axes), may detect a value and a direction of gravity when the accelerometer sensor is stationary, and may be configured to an application to identify a mobile phone posture (for example, screen switching between landscape and portrait modes, a related game, and magnetometer posture calibration), a function related to vibration identification (such as a pedometer and a knock), and the like. The mobile phone 200 may also be configured with other sensors such as a gyroscope, a barometer, a hygrometer, a thermometer, and an infrared sensor, and details are not described herein again.

The audio circuit 280, a speaker 281, and a microphone 282 may provide an audio interface between the user and the mobile phone 200. The audio circuit 280 may convert received audio data to an electrical signal and transmit the electrical signal to the loudspeaker 281, and the loudspeaker 281 converts the electrical signal into a sound signal and outputs the sound signal. Alternatively, the microphone 282 converts a collected sound signal to an electrical signal, and the audio circuit 280 receives the electrical signal, converts the electrical signal to audio data, and then outputs the audio data to the RF circuit 210, to send the audio data to, for example, another mobile phone, or outputs the audio data to the memory 240 for further processing.

Wi-Fi is a short distance wireless transmission technology. The mobile phone 200 may help, through a Wi-Fi module 290, the user to receive and send an e-mail, browse a web page, access streaming media, and so on. The Wi-Fi module 290 provides wireless broadband Internet access for the user. Although FIG. 2 shows the Wi-Fi module 290, it can be understood that the Wi-Fi module 290 is not a necessary component of the mobile phone 200, and when required, the Wi-Fi module 290 can be omitted in a scope without changing essence.

The processor 230 is a control center of the mobile phone 200, connects all parts of the entire mobile phone through various interfaces and lines, and performs various functions and data processing of the mobile phone 200 by running or executing the software program and/or the module stored in the memory 240 and by invoking data stored in the memory 240, to implement a plurality of services based on the mobile phone. Optionally, the processor 230 may include one or more processing units. For example, the processor 230 may integrate an application processor and a modem processor. The application processor mainly processes an operating system, a user interface, an application program, and the like. The modem processor mainly processes wireless communication. It can be understood that the processor 230 may not integrate the modem processor.

In this embodiment, the processor 230 may execute a program instruction stored in the memory 240, to perform methods shown in the following embodiments.

The mobile phone 200 further includes the power supply 220 (such as a battery) to supply power to the components. For example, the power supply may be logically connected to the processor 230 through a power management system, to implement functions such as management of charging, discharging, and energy consumption through the power management system.

Although not shown, the mobile phone 200 may further include a camera, a Bluetooth module, and the like, and details are not described herein again.

Various application programs may be installed on the mobile phone 200. For example, the mobile phone 200 may connect via the RF circuit 210 to a content server, such as Google Play app market, and download a selected application. In particular, the RF circuit 210 may be connected to, for example, an operator server or a content server, and download an application program installation package under control of the processor 230. The mobile phone 200 may also be connected to a content server, such as the Google Play, through the Wi-Fi module 290, and download the selected application. In particular, the Wi-Fi module 290 may be connected to a provider server and download the application program installation package under the control of the processor 230.

Figure 3:
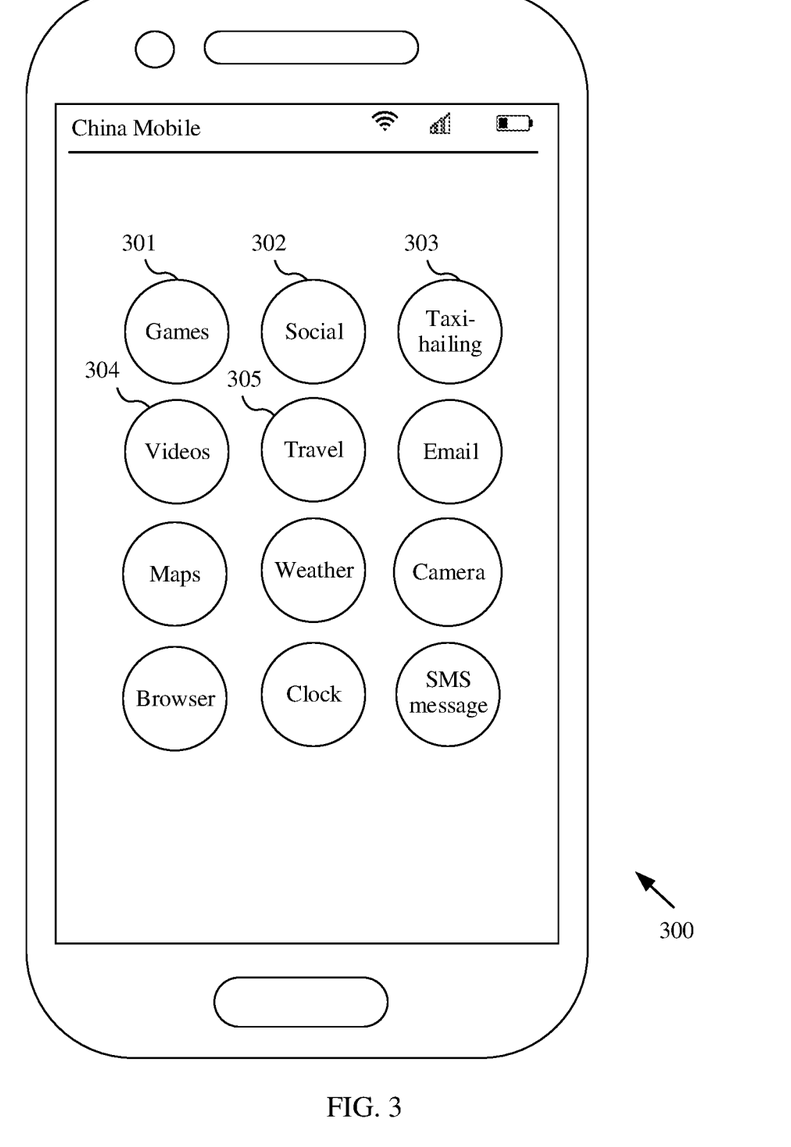
FIG. 3 is a schematic diagram of an interface of user equipment according to an embodiment.

FIG. 3 shows a schematic diagram of an interface of user equipment. As shown in FIG. 3, a game application 301, a social application 302, a taxi hailing application 303, a video application 304, a travel application 305, and the like are installed in the mobile phone 200 (for example, FIG. 3 further includes an email application, a map application, a weather application, a camera application, a browser application, a clock application, and an SMS message application, which are not shown as icons). A plurality of tasks often coexist on the mobile phone 200 device, that is, a user starts a plurality of application programs. For example, the user may watch, in a screen splitting mode, a video provided by the video application 304, and chat with a friend through the social application 302. In addition, applications of different services are different in sensitivity to network environment parameters such as bandwidth and latency. For example, the video application 304 is comparatively sensitive to the network bandwidth, and the social application 302 is comparatively sensitive to the latency. In user equipment using a single PDN connection, data services of the plurality of applications access a network through one PDN path, which inevitably causes problems such as network resource congestion and device stalling. However, using a plurality of PDN connections and allowing the corresponding applications to use a remote IP network through different PDN connections can provide a better network experience for the applications in the device and reduce preemption of the network resource by each application.

Figure 4:
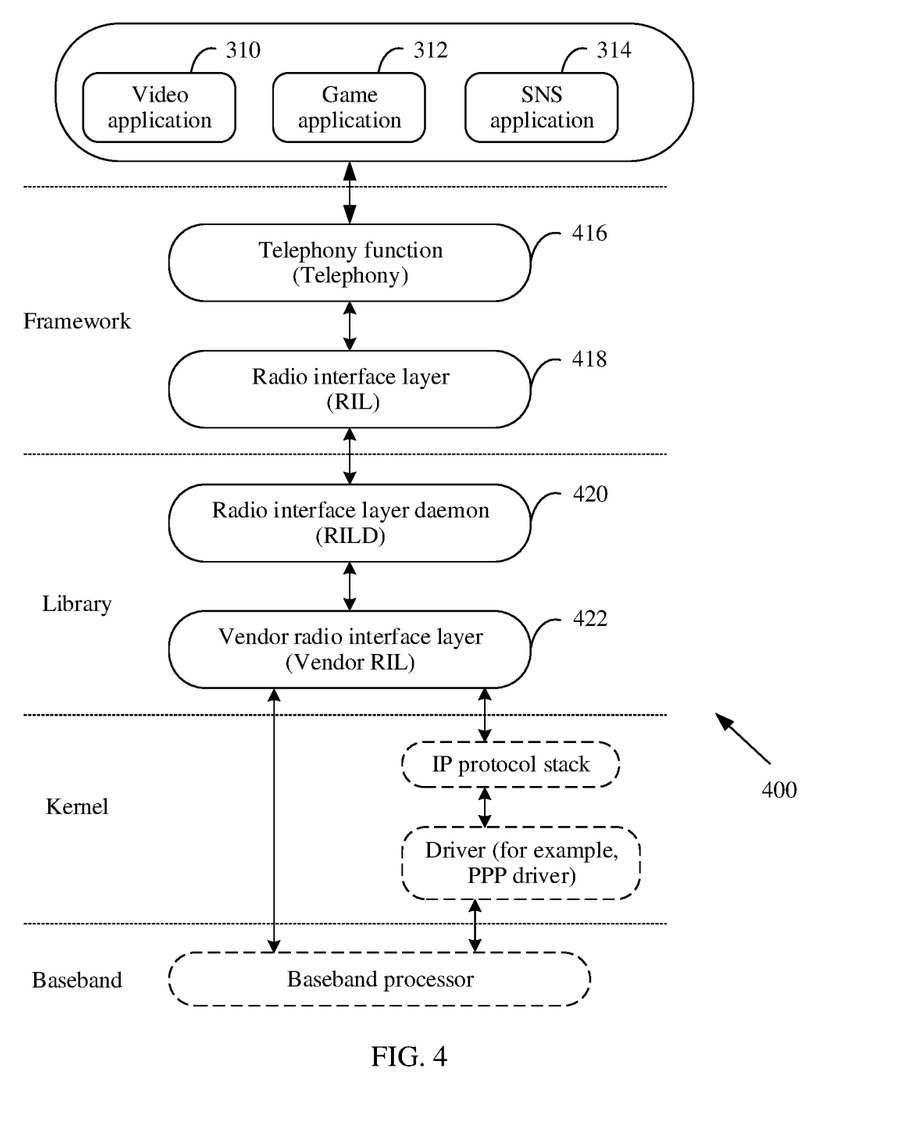
FIG. 4 is a schematic diagram of a software system architecture of user equipment according to an embodiment.

FIG. 4 is a schematic diagram of a software system architecture of user equipment according to an embodiment. As shown in FIG. 4, there is an application program layer, a framework layer, a library layer, a kernel, and a baseband from top to bottom. The application program layer includes the game application 301, the social application 302, the taxi hailing application 303, and other applications that are shown in FIG. 3, providing various services for a user. In the framework layer, a telephony function 401 provides a telephony service for a telephony application (for example, a dialing application or an SMS application) at the application program layer, for example, receiving a called number to make a telephone call. The telephony function 416 interacts with a radio interface layer (RIL) 418. The RIL provides an interface layer between a telephony service and a radio baseband. The RIL is divided into two parts. One part is a radio interface layer daemon (RILD) 420, responsible for communicating with the framework layer through a socket. The other part is a vendor radio interface layer (vendor RIL) 422, responsible for communicating with the radio baseband. The RIL is responsible for reliable transmission of data, AT command sending, and response message parsing, and communicates with a baseband processor through an AT command set. After the user equipment enables a data service (for example, the user enables a data switch of the user equipment), a processor communicates with the baseband processor to send a PDN Connectivity Request message to an MME. The MME verifies an APN provided by the user equipment, selects a PDN GW based on the APN, and then establishes an EPS bearer to perform data service. Subsequently, the user equipment can access at least one external IP network by using an EPS network through a PDN connection. For a specific process of establishing the PDN connection, refer to detailed descriptions of section 5.10.2 "UE requested PDN connectivity" in 3GPP TS 23.401 V11.6.0 (2013-06).

User equipment installed with an Android operating system is used as an example, when a PDN connection is established, PDN GW allocates an IP address to the user equipment and transmits the IP address to the user equipment while establishing a default bearer. With the IP address, the user equipment can use a service provided by the PDN, and then the user equipment activates a corresponding network adapter (for example, rmnet 0 or rmnet 1), and a network adapter state is set to a start state, namely, an UP state. If the user equipment establishes a plurality of PDN connections, for example, after establishing a first PDN connection, the user equipment activates a first network adapter (rmnet 0), binds an IP address obtained when the first PDN is established, with the first network adapter, activates a second network adapter (rmnet 1) after a second PDN connection is established, and binds an IP address obtained when the second PDN connection is established, with a second network adapter.

After enabling the data switch, the user equipment may send a PDN connection establishment request message to the MME to establish the first PDN connection, and provide a data transmission service for the first application program (for example, a Facebook application) of the user equipment through the first PDN connection.

When the processor 230 detects that the user equipment starts a second application program (for example, a WeChat application), when the processor 230 detects that the user equipment turns on a mobile data switch, or when the processor 230 receives an input data service enhancement setting indication for the second application program (for example, when detecting that the user taps a "data service enhancement" button or a "network acceleration" button, the processor 230 enables the user to set up permission to establish a second PDN connection as required), the processor 230 starts a process to establish the second PDN connection, and after the second PDN connection is successfully established, transmits at least a part of data service of the second application program through the second PDN connection.

After the second application program is started, the socket needs to be created to communicate with a remote server.

The socket is a communication mode established between a client and a server, and a programming and invocation interface for encapsulating the TCP/IP protocol. That is, we can use the TCP/IP protocol on an Android platform through the socket for development. The socket is not a protocol, but is an application programming interface (API), and belongs to a transmission layer (mainly resolves how data is transmitted in a network). The second application program may set the source IP address to be an IP address obtained through the second PDN connection, that is, the second application program may transmit at least a part of service data through the second network adapter.

Figure 5:
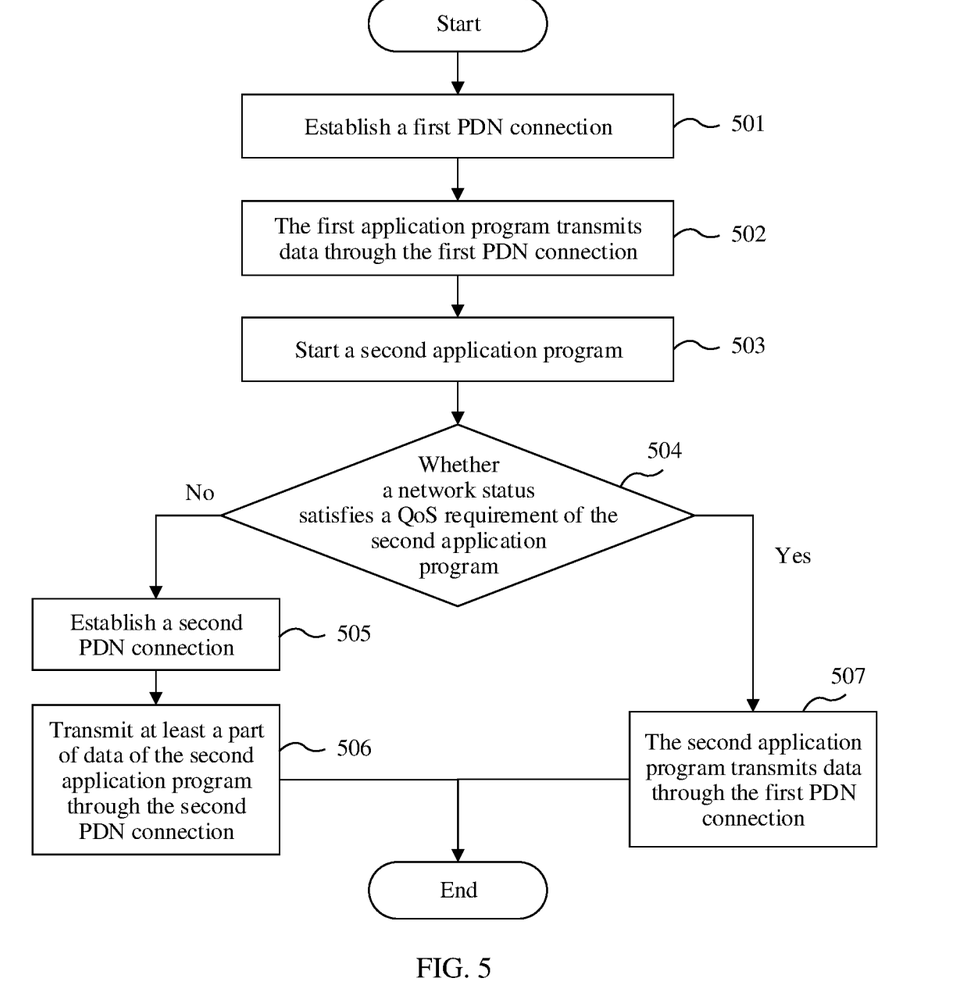
FIG. 5 is a flowchart of processing of a network performance improvement method for user equipment according to an embodiment.

FIG. 5 is a processing flowchart of a network performance improvement method for user equipment according to an embodiment. As shown in FIG. 5, steps of the method are as follows.

Step 501: The user equipment establishes a first PDN connection to a mobile network.

After enabling a data switch, the user equipment may send a PDN connection establishment request message to an MME to establish the first PDN connection, and further provide data service support for an application program of the user equipment. The mobile network may be any one of a 2G, a 3G, a 4G, or a future 5G network, and so on.

Step 502: The user equipment transmits service data of a first application program of the user equipment through the first PDN connection.

When the user equipment has established the PDN connection related to an APN, the first application program may transmit data through the first PDN connection, and access a server of the first application program.

Step 503: The user equipment starts a second application program.

In some embodiments, a user taps an icon of the second application program to start the second application program (for example, the user taps an icon of a game application 301 to start the game application 301), and the user may further customize a startup application list. In this way, after the user equipment is powered on, all application programs in the startup application list are started.

In some embodiments, for user equipment using an Android system, after the system, or a user application program sends a broadcast, if an eligible application program is not started, the application program is started first, for example, some applications are registered for a broadcast of a network status change (android.net.conn.CONNECTIVITY_CHANGE). In this way, after the network status of the user equipment changes (for example, switching from no network to a 4G network), an application program that needs to receive a broadcast of the network status change is also started.

Optionally, the second application program is an application program in a preset application list stored by the user equipment. Because a plurality of application programs are usually installed on the user equipment, but a network resource is limited, to provide a network enhancement service for a specific application, the user equipment stores the preset application list, namely, a list of application programs that can use a plurality of PDN connections. When an application program in the preset application list is started, a process of establishing the second PDN connection may be started.

Figure 6:
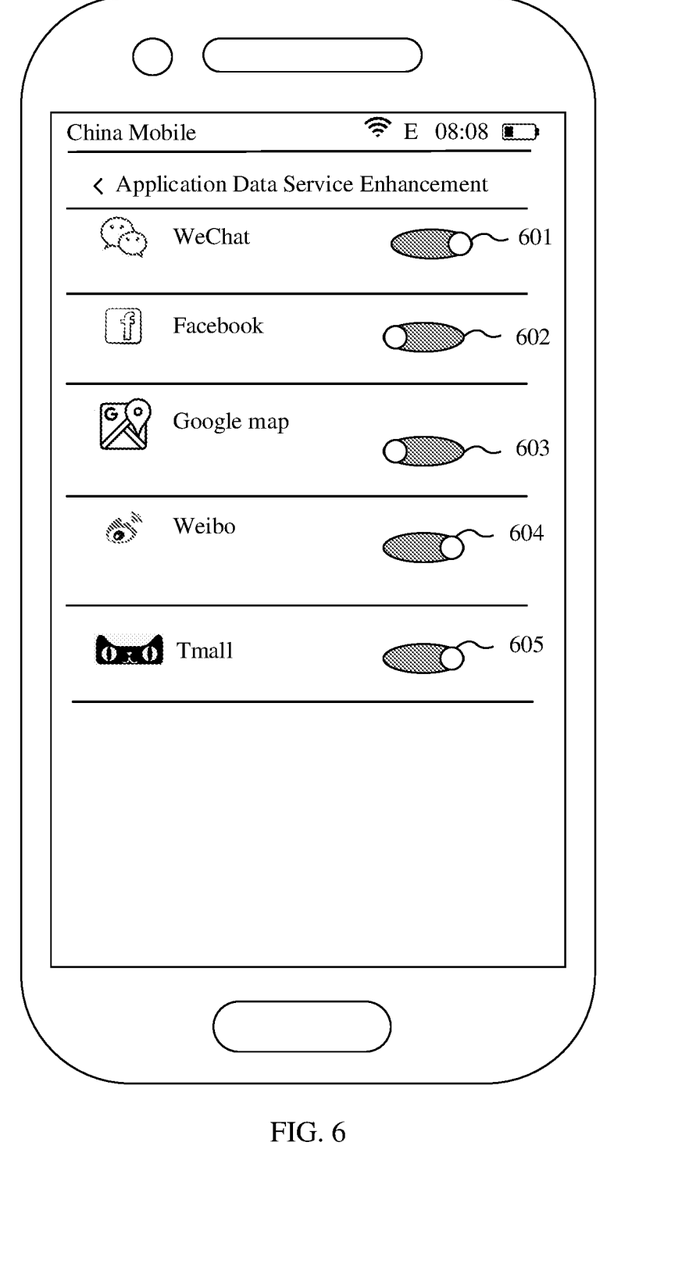
FIG. 6 is a schematic diagram of a data service enhancement management interface of user equipment according to an embodiment.

The following describes how to construct the foregoing application list. In an embodiment, the user equipment may receive a user input to set the foregoing application list. For example, a user self-selects, through a data service enhancement management interface shown in FIG. 6, the foregoing application list from applications installed on the user equipment. In FIG. 6, a WeChat application, a Weibo application, and a Tmall application enable a data service enhancement service (namely, permission to dynamically establish a second PDN connection is set for the application), in other words, a switch 601, a switch 604, and a switch 605 are in a turn-on state; and a Facebook application and a Google map application do not enable the data service enhancement service, in other words, a switch 602 and switch 603 are in a turn-off state. In this case, the application list includes the WeChat application, the Weibo application, and the Tmall application. When any one of the three applications is started, the user equipment may establish the second PDN connection as required and transmit data through the second PDN connection.

In some embodiments, the user equipment may prompt, when installing an application program, the user whether to enable the data service enhancement service (namely, multiple PDN connectivity service). For example, the user equipment may connect to a content server, find a to-be-installed application program, download the found application program, and send, through a touch gesture, a request for installing the downloaded application program. Then the processor may request the user to confirm whether to enable the data service enhancement service, and check whether the user has confirmed the data service enhancement service. When the user determines to enable the data service enhancement service for the application program, the processor may add information about the application program to the application list. For example, the display unit may output a pop-up box that requests the user to determine whether to enable the data service enhancement service for the application program. When the user determines to enable the data service enhancement service for the application program, the processor updates the application list. Here, the processor may add identification information of the application program to the application list. Then, the processor installs the application program.

In another embodiment, the user equipment may create a list of user's favorite applications in a manner of collecting statistics about use habits of the user for different application programs. For example, the user equipment may determine priorities of application programs of the user equipment based on application execution time or an application use frequency, and store the application identifiers (for example, application names) of first N applications with comparatively high priorities in the foregoing application list.

When collecting statistics about usage for using an application program of the mobile terminal by the user, usage for using the corresponding application program by the user in a specific period of time may be determined by obtaining application program usage data (for example, running time of the application program and a quantity of times for starting the application program) recorded in the foregoing statistics. Information about an application program that the user of the user equipment frequently uses, namely, the information about the frequently used application program, may be determined by comparing usage data of all application programs of the user equipment, to determine a usage habit and a preference of the user for the application program. In some embodiments, the application list may be used to record information about an application program whose usage data (for example, running time and/or a quantity of taps) satisfies a preset condition, to reflect a usage habit and a preference of the user for the application program.

In another embodiment, the user equipment may interact with the server to obtain the foregoing application list, for example, to obtain, from an application market server of a device vendor, at least one application that satisfies the preset condition, such as at least one of top applications downloaded in the application market, at least one of applications whose user attention degrees rank ahead, so as to form the application list based on the obtained at least one application.

Step 503: Determine whether the network status of the mobile network accessed by the user equipment satisfies a quality of service requirement of the second application program.

The network status of the network accessed by the user equipment includes conditions of a network latency, a packet loss rate, a retransmission rate, and a bandwidth. The network status of the network accessed by the user equipment affects quality of service, and application of different services has different sensitivity to network status parameters such as the bandwidth and the latency.

For example, when a real-time data service is processed, ensuring a transmission latency within a specified time period is an important issue directly related to the quality of service. For example, in a voice call service such as VoIP, if the transmission latency within the specified time period is not ensured, the voice is intermittent, and the quality of service is greatly reduced. For another example, voice data and video data that are received and sent in a video call system, data used to reflect real-time status information of various sensors forming an internet of things (IoT), control data used to remotely control an unmanned aerial vehicle, and the like may be real-time data, and the data services are comparatively sensitive to a network latency indicator.

For a video application, more bandwidth is being consumed for streaming movies and short video content. A video quality level is affected by bandwidth, and therefore, each terminal user is intended to select, for example, a highest rate at which processing can be performed through their Internet connections. Quality of a video content stream is affected by a quantity of available bandwidths, and a capacity of the user equipment needs to be constantly increased to keep up with an increasing demand.

The QoS requirement of the second application program is stored in the user equipment, and quality of service includes a latency, a bandwidth, a packet loss rate, and the like. When the second application program is started, the network status of the currently accessed network is detected and compared with the stored QoS requirement, and if the current network status cannot satisfy the QoS requirement of the second application program, a process of establishing the second PDN connection is performed.

The user equipment may set corresponding QoS requirements for different applications. For example, a video application has a comparatively high bandwidth requirement, and an online game application focus mainly on a network latency, but not on a transmission rate of the connection. Therefore, the user equipment may store the QoS requirement table shown in Table 1.

TABLE 1

| Application | Latency (maximum value) | Rate (minimum value) |
|---|---|---|
| Video application | 90 ms | 4 Mbps |
| Online game application | 60 ms | 2 Mbps |

As shown in Table 1, the QoS parameters in Table 1 specify a specific amount of bandwidth, a maximum latency, or a jitter required by the application program. The video application has the following requirement for the latency and the rate: latency <90 ms, and rate >4 Mbps. The online game application has the following requirement for the latency and the rate: latency <60 ms, and rate >2 Mbps. A network connection status that satisfies the foregoing parameter requirements are considered as a healthy connection. In this case, when the bandwidth required for obtaining the video content is less than 4 Mbps, and the network latency is less than 90 ms, the user can obtain smooth video experience.

When it is determined that the network status of the mobile network accessed by the user equipment does not satisfy the quality of service requirement of the second application program, step 505 and step 506 are performed. When it is determined that the network status of the mobile network accessed by the user equipment satisfies the quality of service requirement of the second application program, step 507 is performed.

Step 505: The user equipment establishes a second PDN connection.

The user equipment may use an APN that is the same as or different from that of the first PDN connection to start the second PDN connection. For a specific PDN connection establishment process, refer to detailed descriptions of section 5.10.2 "UE requested PDN connectivity" in 3GPP TS 23.401 V11.6.0 (2013-06).

Step 506: The user equipment transmits at least a part of data service of the second application program through the second PDN connection.

After the second PDN connection is established successfully, all data of the second application program may be transmitted through the second PDN connection, or at least a part of data of the second application program is transmitted through the second PDN connection (that is, the second application program transmits data to the server on the network side through both the first PDN connection and the second PDN connection). The user equipment determines, based on to-be-transmitted data information of the second application program, whether to use the plurality of PDN connections to transmit the to-be-transmitted data.

In some embodiments, the user equipment determines, based on the type of the second application program, whether to use the plurality of PDN connections to transmit the data of the second application program. For example, for a download application program (for example, video file download), data can be transmitted through both the first PDN connection and the second PDN connection. For a real-time application program (for example, a social application), only the second PDN connection can be used to transmit the data.

In some embodiments, whether to use a plurality of PDN connections to transmit the data of the second application program is determined based on other information. For example, if there is a particular requirement for a transmission speed of the to-be-transmitted data of the second application program, two or more PDN connections are used for transmission, and the user equipment sets multiple PDN connectivity-based transmission for the second application program, to determine whether to use the plurality of PDN connections of the user equipment to transmit the to-be-transmitted data.

If the user equipment uses both the first PDN connection and the second PDN connection to transmit the data, the user equipment allocates the to-be-transmitted data to the two PDN connections according to a specific rule. In an implementation, an optional manner is: the user equipment determines, based on a current service volume of the two PDN connections, how to allocate the service data of the second application program to the two PDN connections, so as to implement a service volume balance between the two PDN connections as much as possible. Another optional manner is: the user equipment determines an allocation solution for the to-be-transmitted service data of the second application program based on service quality information of the two PDN connections. The service quality information of the PDN connections may include signal quality and a data transmission rate. An appropriate data allocation solution is selected for the to-be-transmitted data based on the service quality information such as the signal quality and the data transmission rate. More to-be-transmitted data blocks are allocated to a PDN connection with good service quality, and correspondingly, fewer to-be-transmitted data blocks are allocated to some other PDN connections with slightly poorer service quality. Therefore, load of the plurality of PDN connections of the user equipment is more balanced, and efficient data transmission is ensured.

Step 507: The user equipment transmits the service data of the second application program through the first PDN connection.

If it is determined that the network status of the mobile network accessed by the user equipment satisfies the quality of service requirement of the second application program, the user equipment can satisfy the service requirement of the second application program without establishing a new PDN connection. In this case, the user equipment can dynamically establish a new PDN connection based on the network status and the service requirement, improving network performance experience of the user equipment.

In some embodiments, the processor may further release a PDN connection. For example, if the second application program no longer needs the service (for example, when the second application program stops running or exits), the processor may release the second PDN connection.

Figure 7:
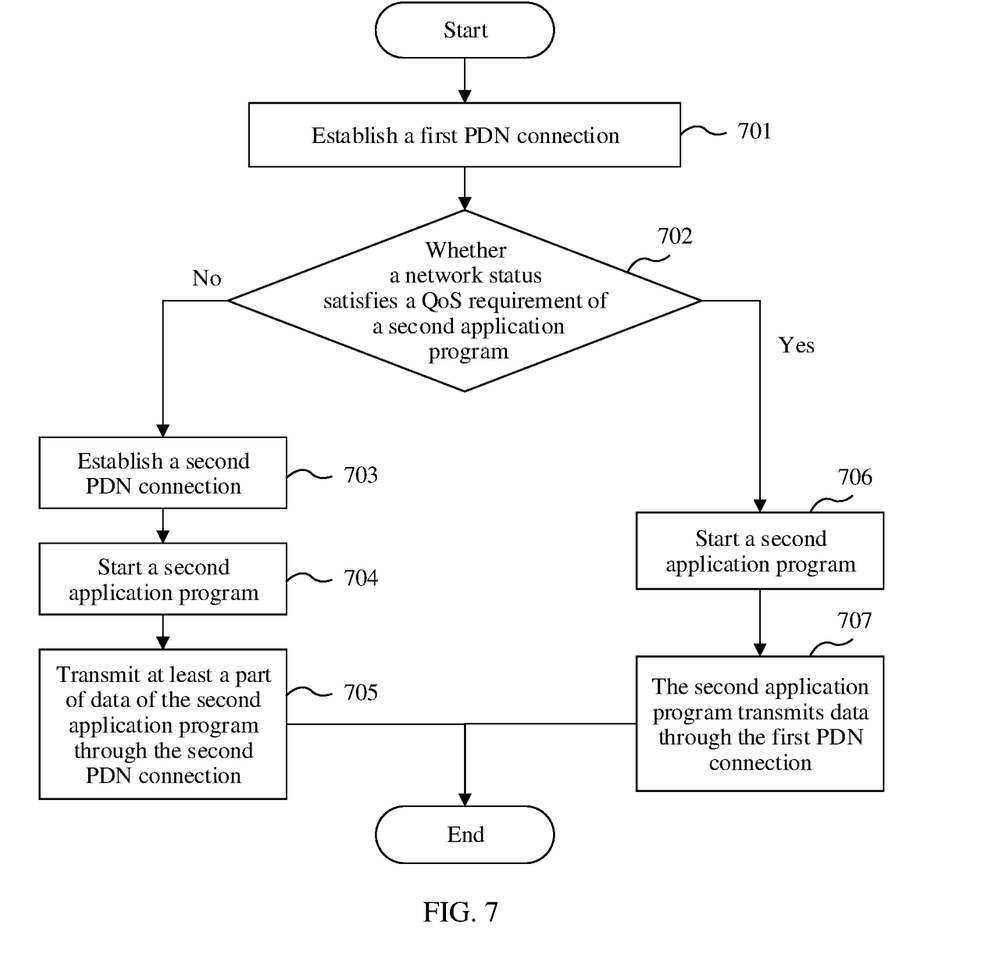
FIG. 7 is a flowchart of processing of another network performance improvement method for user equipment according to an embodiment.

FIG. 7 is a flowchart of processing of another network performance improvement method for user equipment according to an embodiment. As shown in FIG. 7, steps of the method are as follows:

Step 701: User equipment establishes a first PDN connection to a mobile network. The method for establishing the first PDN connection in step 701 is the same as the method in step 501.

Step 702: The user equipment determines whether a network status of the accessed mobile network satisfies a quality of service requirement of a second application program. A judging method in step 702 is the same as that in step 504. When it is determined that the network status of the mobile network accessed by the user equipment does not satisfy the quality of service requirement of the second application program, step 703, step 704, and step 705 are performed. When it is determined that the network status of the mobile network accessed by the user equipment satisfies the quality of service requirement of the second application program, step 706 and step 707 are performed.

Step 703 is the same as step 505, in which the user equipment establishes a second PDN connection. In step 704, the user equipment starts the second application program. Step 705 is the same as step 506, in which the user equipment transmits at least a part of service data of the second application program through the second PDN connection.

When it is determined that the network status of the mobile network accessed by the user equipment satisfies the quality of service requirement of the second application program, step 706 and step 707 are performed. In step 706, the user equipment starts the second application program. Step 707 is the same as step 507, in which the second application program transmits the service data through the first PDN connection.

According to the method procedure in FIG. 7, after turning on the mobile data switch, the user equipment first establishes the first PDN connection, and after starting the first application program, the user equipment may transmit the service data through the first PDN connection. Then, the user equipment judges whether the current network status satisfies the QoS requirement of the second application program, and if the current network status does not satisfy the QoS requirement of the second application program, the user equipment starts a process of establishing the second PDN connection. After the second PDN connection is established, the user equipment may transmit at least a part of the service data through the second PDN connection. In this way, after the user equipment turns on the mobile data switch, if a network condition does not satisfy the QoS requirement of the second application program, the process of establishing the second PDN connection can be started; and when starting the second application program, the user can use the second PDN connection to transmit the data, improving running efficiency of the second application program.

In some embodiments, after turning on the mobile data switch, the user equipment first establishes the first PDN connection, and then establishes the second PDN connection. After establishing the second PDN connection, the user equipment may transmit, after starting the second application program, the at least a part of service data through the second PDN connection. In this way, after the user equipment turns on the mobile data switch, a step of judging whether the network status satisfies the QoS requirement of the second application program is omitted. In this way, a processing procedure is simpler, and the established second PDN connection can be used after the second application is started, improving network access efficiency of the second application program.

In an embodiment, old traffic flow may be switched from the first PDN to a new PDN (for example, the second PDN connection). Transmission of an IP flow may be performed by using a variety of protocols and methods. For example, IMS allows a real-time IP flow at an application level to be transferred from one IP address to another IP address, without interrupting service. After the second PDN connection is established, service data of the first application program may be switched to the second PDN connection for transmission.

According to the method in this embodiment, the first application program and the second application program may access a remote network through different PDN connections, thereby reducing load of a single PDN connection, and improving network access efficiency of the application programs. After the second application program is started, the second PDN connection is established when the network status does not satisfy the QoS requirement of the second application program. In this way, a process of dynamically establishing the second PDN connection only when the user uses the second application program can be started, that is, the second PDN connection is established as required, improving flexibility of the user equipment.

In this embodiment, division of function modules may be performed on the foregoing user equipment according to the foregoing method examples. For example, the function modules may be divided corresponding to the functions, or two or more functions may be integrated into one processing module. The integrated module may be implemented in a form of hardware, or may be implemented in a form of a software function module. It should be noted that, in this embodiment, the module division is an example, and is merely a logical function division. In actual implementation, another division manner may be used.

Figure 8:
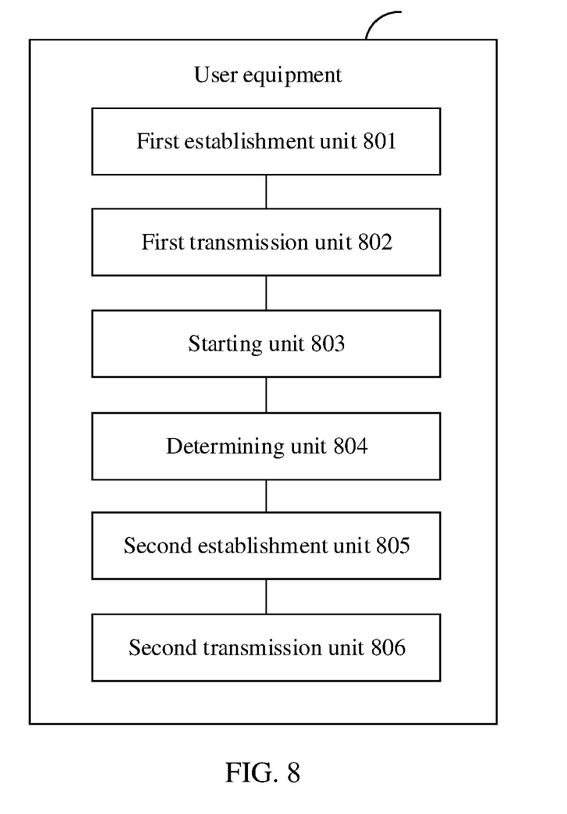
FIG. 8 is a schematic structural diagram of another user equipment according to an embodiment.

When each function module is obtained through division based on each corresponding function, as shown in FIG. 8, an embodiment provides user equipment 800. The user equipment 800 includes a first establishment unit 801, a first transmission unit 802, a starting unit 803, a determining unit 804, a second establishment unit 805, and a second transmission unit 806. Related actions of these function modules can be referred to the relevant descriptions in FIG. 5. For example, the first establishment unit 801 is configured to perform step 501, the first transmission unit 802 is configured to perform step 502, the starting unit 803 is configured to perform step 503, the determining unit 804 is configured to perform step 504, the second establishment unit 805 is configured to perform step 505, and the second transmission unit 806 is configured to perform step 506.

Figure 9:
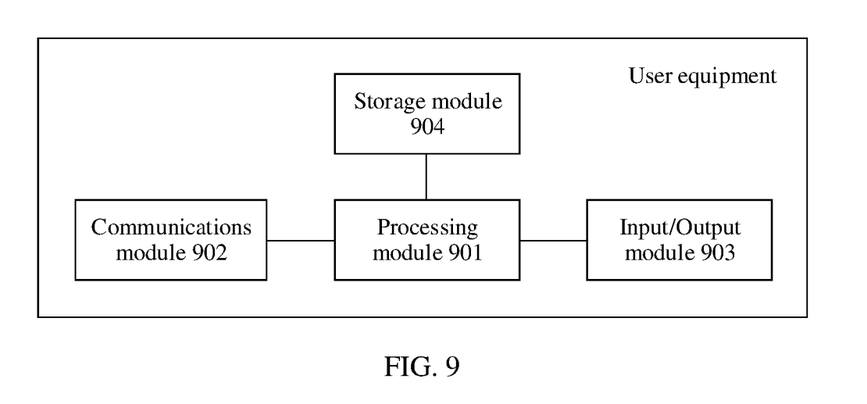
FIG. 9 is a schematic structural diagram of still another user equipment according to an embodiment.

When an integrated unit is used, as shown in FIG. 9, FIG. 9 shows another possible schematic structural diagram of the user equipment in the foregoing embodiments. The user equipment includes a processing module 901, a communications module 902, an input/output module 903, and a storage module 904.

The processing module 901 is configured to control and manage an action of the user equipment. The communications module 902 is configured to support communication between the user equipment and other network entities. The input/output module 903 is configured to receive information input by the user or output information provided for a user and various menus of a terminal. The storage module 904 is configured to store program code and data of the user equipment.

When the processing module 901 is a processor (such as the processor 230 shown in FIG. 2), the communications module 902 is a radio frequency circuit (such as the radio frequency circuit 210 shown in FIG. 2), the storage module 904 is a memory (such as the memory 240 shown in FIG. 2), and the input/output module 903 is a touchscreen (including the touch panel 251 and the display panel 261 shown in FIG. 2), the user equipment provided in may be the mobile phone 200 shown in FIG. 2. The communications module 902 may not only include the radio frequency circuit, but may also include a Wi-Fi module and a Bluetooth module. The communications modules such as the radio frequency circuit, the Wi-Fi module, and the Bluetooth module may be collectively referred to as a communications interface. The processor, the communications interface, the touchscreen, and the memory may be coupled together through a bus.

An embodiment further provides user equipment, including a processor and a memory. The memory is configured to store computer program code, and the computer program code includes a computer instruction. When executing the computer instruction, the processor executes the network performance improvement method in the foregoing method embodiments (for example, FIG. 5 or FIG. 7).

An embodiment further provides a computer storage medium. The computer storage medium stores computer program code. When the processor executes the computer program code, user equipment executes the related method steps in FIG. 5 or FIG. 7 to implement the method in the foregoing embodiments.

An embodiment further provides a computer program product. When the computer program product is run on a computer, the computer is enabled to execute the related method steps in FIG. 5 or FIG. 7 to implement the method in the foregoing embodiments.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments are all, or partially, generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely implementations of embodiments, but are not intended to limit the protection scope. Any variation or replacement within the technical scope disclosed shall fall within the protection scope of this application.

What is claimed is:

1. A network performance improvement method for user equipment, comprising:
   establishing, by the user equipment, a first packet data network (PDN) connection to a mobile network;
   transmitting, by the user equipment, service data of a first application program of the user equipment through the first PDN connection;
   starting, by the user equipment, a second application program;
   determining, by the user equipment, whether a network status of the accessed mobile network satisfies a quality of service requirement of the second application program;
   establishing, by the user equipment, a second PDN connection to the mobile network when the network status of the mobile network does not satisfy the quality of service requirement of the second application program;
   transmitting, by the user equipment, at least a part of service data of the second application program through the second PDN connection; and
   transmitting, by the user equipment, at least a part of the service data of the second application program through the first PDN connection.

2. The method according to claim 1, wherein after the starting a second application program, the method further comprises: determining that an identifier of the second application program exists in a preset application list.

3. The method according to claim 2, further comprising: creating the preset application list according to a usage habit of a user.

4. The method according to claim 2, further comprising: installing the second application program and adding the identifier of the second application program to the preset application list.

5. The method according to claim 1, further comprising:
stopping, by the user equipment, a running of the second application program; and
releasing, by the user equipment, the second PDN connection in response to the stopping of the running the second application program.

6. The method according to claim 1, wherein the network status of the mobile network comprises: at least one of a latency, a bandwidth, or a jitter.

7. User equipment, comprising a memory, one or more processors, a plurality of application programs, and one or more programs, wherein the one or more programs are stored in the memory; and, when executing the one or more programs, the one or more processors, enable the user equipment to perform the following steps:
establishing a first packet data network PDN connection between the user equipment and a mobile network;
transmitting service data of a first application program through the first PDN connection;
starting a second application program;
determining whether a network status of the accessed mobile network satisfies a quality of service requirement of the second application program;
establishing a second PDN connection between the user equipment and the mobile network when the network status of the mobile network does not satisfy the quality of service requirement of the second application program;
transmitting at least a part of service data of the second application program through the second PDN connection; and
transmitting at least a part of service data of the second application program through the first PDN connection.

8. The user equipment according to claim 7, wherein when executing the one or more programs, the one or more processors further enable the user equipment to perform the following step: determining that an identifier of the second application program exists in a preset application list.

9. The user equipment according to claim 8, wherein when executing the one or more programs, the one or more processors further enable the user equipment to perform the following step: creating the preset application list according to a usage habit of a user.

10. The user equipment according to claim 8, wherein when executing the one or more programs, the one or more processors further enable the user equipment to perform the following steps: installing the second application program and adding the identifier of the second application program to the preset application list.

11. The user equipment according to claim 7, wherein when executing the one or more programs, the one or more processors further enable the user equipment to perform the following steps:
stopping, by the user equipment, a running of the second application program; and
releasing, by the user equipment, the second PDN connection in response to the stopping of the running the second application program.

12. The user equipment according to claim 7, wherein the network status of the mobile network comprises: at least one of a latency, a bandwidth, or a jitter.

13. A non-transitory computer readable medium configured to store instructions that, when executed by at least one processor of an electronic device, cause the electronic device to perform operations comprising:
establishing a first packet data network PDN connection between the electronic device and a mobile network;
transmitting service data of a first application program through the first PDN connection;
starting a second application program;
determining whether a network status of the accessed mobile network satisfies a quality of service requirement of the second application program;
establishing a second PDN connection between the electronic device and the mobile network when the network status of the mobile network does not satisfy the quality of service requirement of the second application program;
transmitting at least a part of service data of the second application program through the second PDN connection; and
transmitting at least a part of the service data of the second application program through the first PDN connection.

14. The non-transitory computer readable medium according to claim 13, wherein the operations further comprise: determining that an identifier of the second application program exists in a preset application list.

15. The non-transitory computer readable medium according to claim 14, wherein the operations further comprise creating the preset application list according to a usage habit of a user.

16. The non-transitory computer readable medium according to claim 14, wherein the operations further comprise: installing the second application program and adding the identifier of the second application program to the preset application list.

17. The non-transitory computer readable medium according to claim 13, wherein the operations further comprise:
stopping a running the second application program; and
releasing the second PDN connection in response to the stopping of the running the second application program.

\* \* \* \* \*